US012768294B2

(12) United States Patent
Thelen et al.

(10) Patent No.: US 12,768,294 B2
(45) Date of Patent: Oct. 20, 2026

(54) AFTERTREATMENT SYSTEM INCLUDING DIFFERENTIAL PRESSURE SENSORS AND PRESSURE TUBE SEGMENTS

(71) Applicant: Cummins Emission Solutions Inc., Columbus, IN (US)

(72) Inventors: Patrick Thelen, McFarland, WI (US); Kasargod Anil Shenoy, Columbus, IN (US); Zachary S Bryant, Columbus, IN (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 301 days.

(21) Appl. No.: 18/737,321

(22) Filed: Jun. 7, 2024

(65) Prior Publication Data

US 2025/0376938 A1 Dec. 11, 2025

(51) Int. Cl.

| | |
|---|---|
| ***F01N 11/00*** | (2006.01) |
| ***B01D 53/94*** | (2006.01) |
| ***F01N 3/021*** | (2006.01) |
| ***F01N 3/20*** | (2006.01) |
| ***F01N 13/00*** | (2010.01) |

(52) U.S. Cl.

CPC ........ *F01N 11/002* (2013.01); *B01D 53/9418* (2013.01); *B01D 53/9495* (2013.01); *F01N 3/021* (2013.01); *F01N 3/2066* (2013.01); *F01N 13/011* (2014.06); *B01D 2251/2062* (2013.01); *B01D 2257/404* (2013.01); *B01D 2258/01* (2013.01); *F01N 2550/02* (2013.01); *F01N 2550/04* (2013.01); *F01N 2610/1453* (2013.01)

(58) Field of Classification Search

CPC ............................. F01N 11/002; F01N 13/011

See application file for complete search history.

(56) References Cited

U.S. PATENT DOCUMENTS

2022/0034245 A1* 2/2022 Wang ..................... F01N 3/022

* cited by examiner

*Primary Examiner* — Kevin Joyner

(74) *Attorney, Agent, or Firm* — Foley & Lardner LLP

(57) ABSTRACT

An aftertreatment system includes a decomposition housing, a doser coupled to the decomposition housing, a first unit upstream of the decomposition housing, a second unit downstream of the decomposition housing, a first differential pressure (DP) sensor, a second DP sensor, a first pressure tube (PT) segment, a second PT segment, and a third PT segment. The decomposition housing includes a decomposition housing port for providing fluid communication through the decomposition housing. The first unit includes a first port for providing fluid communication through a housing of the first unit. The second aftertreatment unit includes a second port for providing fluid communication through a housing of the second unit. The first PT segment is in fluid communication with the decomposition housing port, a first inlet of the first DP sensor, and a first inlet of the second DP sensor.

8 Claims, 9 Drawing Sheets

AFTERTREATMENT SYSTEM INCLUDING DIFFERENTIAL PRESSURE SENSORS AND PRESSURE TUBE SEGMENTS

TECHNICAL FIELD

The present disclosure relates generally to an aftertreatment system for an internal combustion engine.

BACKGROUND

It is desirable to reduce emissions of certain components in exhaust produced by combustion of fuel in an internal combustion engine system. Emissions of the exhaust may be reduced by treating the exhaust in an aftertreatment system, which may include various sensors (e.g., differential pressure sensors) for monitoring the treatment process. In some instances, multiple sensors may need to be installed in the same aftertreatment system to monitor flow conditions of the exhaust during a treatment process. For example, reducing emissions of the exhaust may include providing the exhaust to two catalyst members in parallel (e.g., in a dual-legged aftertreatment system design). In some instances, the two catalyst members are packaged separately and arranged in parallel. As a result, a flow of the exhaust is split between the two catalyst members. The installation of two parallel catalyst members may cause the exhaust to have different flow conditions (e.g., backpressure) between the two catalyst members, thereby rendering the need to utilize additional differential pressure (DP) sensors for monitoring occurrence of such different flow conditions. Installing additional DP sensors increases cost.

SUMMARY

In one embodiment, an aftertreatment system includes a decomposition housing, a doser, a first aftertreatment unit, a second aftertreatment unit, a first differential pressure sensor, a second differential pressure sensor, a first pressure tube segment, a second pressure tube segment, and a third pressure tube segment. The decomposition housing includes a decomposition housing port configured to provide fluid communication through the decomposition housing. The doser is coupled to the decomposition housing and configured to introduce a reductant to the decomposition housing. The first aftertreatment unit is located upstream of the decomposition housing. The first aftertreatment unit includes a first aftertreatment component and a first aftertreatment component housing that houses the first aftertreatment component. The first aftertreatment component housing includes a first aftertreatment component housing port configured to provide fluid communication through the first aftertreatment component housing. The second aftertreatment unit is located downstream of the decomposition housing. The second aftertreatment unit includes a second aftertreatment component and a second aftertreatment component housing that houses the second aftertreatment component. The second aftertreatment component housing includes a second aftertreatment component housing port configured to provide fluid communication through the second aftertreatment component housing. The first differential pressure sensor includes a first sensor first inlet and a first sensor second inlet. The second differential pressure sensor includes a second sensor first inlet and a second sensor second inlet. The first pressure tube segment is in fluid communication with the decomposition housing port, the first sensor first inlet, and the second sensor first inlet. The second pressure tube segment is in fluid communication with the first sensor second inlet and the first aftertreatment component housing port. The third pressure tube segment is in fluid communication with the second sensor second inlet and the second aftertreatment component housing port.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

Figure 1:
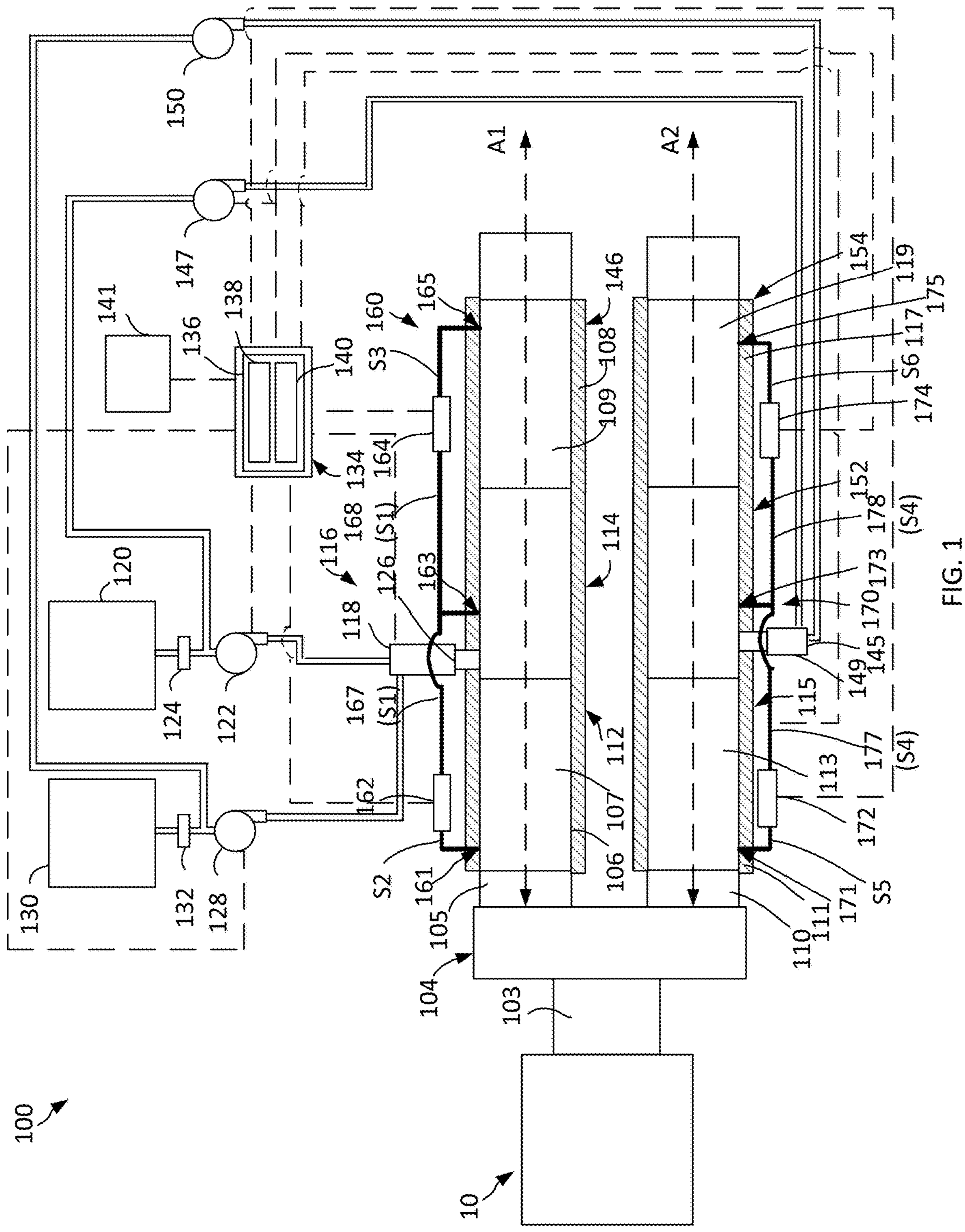
FIG. 1 is a schematic diagram of an example aftertreatment system including a housing assembly with a distributing housing.

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, an aftertreatment system including differential pressure (DP) sensors and pressure tube segments configured to facilitate the use of the DP sensors. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Aftertreatment systems are generally defined by a space claim. The space claim is the amount of physical space that an aftertreatment system consumes when installed (e.g., on a vehicle, etc.) and the location (e.g., coordinates relative to a vehicle coordinate system, etc.) of the physical space that is consumed by the aftertreatment system when installed. In some applications, the physical space available for use by an aftertreatment system is limited due to the locations of surrounding components, wiring, or piping requirements, or other similar constraints. As such, it is often difficult to modify an aftertreatment system (e.g., by adding components, etc.) because such modifications, although desirable for improving performance of the aftertreatment system, can typically increase the space claim of the aftertreatment system. For example, it may be desirable to incorporate multiple DP sensors in an aftertreatment system to better monitor flow conditions in the aftertreatment system. However, adding such components may also increase the space claim of the aftertreatment system.

Implementations described herein are related to an aftertreatment system having a first decomposition housing, a first aftertreatment unit (e.g., an exhaust filtration unit, etc.) upstream of the first decomposition housing, and a second aftertreatment unit (e.g., a selective catalytic reduction (SCR) catalyst member, etc.) downstream of the first decomposition housing. The aftertreatment system further includes a first DP sensor, a second DP sensor, a pressure tube assembly configured to facilitate measurement of DP using the first DP sensor and the second DP sensor across the first aftertreatment unit and the second aftertreatment unit (and the decomposition housing). The pressure tube assembly includes one branched pressure tube segment configured to fluidly couple a common pressure port to inlets of the first DP sensor and the second DP sensor. By using the branched pressure tube segment, a total number of the pressure ports needed to facilitate the DP measurement in the aftertreatment system can be reduced, thereby reducing the breaching of the components in the aftertreatment system and decreasing the space claim of the aftertreatment system. In various embodiments, the DP measurements obtained using the first DP sensor, the second DP sensor, and the pressure tube assembly may be used to monitor backpressure of the exhaust within the first decomposition housing, the first aftertreatment unit, and the second aftertreatment unit as well as any potential imbalance in flow conditions of the exhaust in the overall aftertreatment system.

II. An Example Aftertreatment System

FIG. 1 depicts an aftertreatment system 100 for treating exhaust produced by an internal combustion engine system 10. The internal combustion engine system 10 includes an internal combustion engine (e.g., diesel internal combustion engine, gasoline internal combustion engine, hybrid internal combustion engine, propane internal combustion engine, dual-fuel internal combustion engine, etc.). The aftertreatment system 100 is configured to facilitate treatment of the exhaust. The treatment may facilitate reduction of emission of undesirable components (e.g., nitrogen oxides (NOx), sulfur oxides (SOx), etc.) in the exhaust. The treatment may additionally or alternatively facilitate conversion of various oxidation components (e.g., carbon monoxide (CO), hydrocarbons (HC), etc.) of the exhaust into other components (e.g., $CO_2$, water vapor, etc.). The treatment may additionally or alternatively facilitate removal of particulates (e.g., soot, particulate matter, etc.) from the exhaust.

The aftertreatment system 100 includes a first upstream exhaust conduit 103 (e.g., line, pipe, etc.). The first upstream exhaust conduit 103 is fluidly coupled to (or in fluid communication with) an outlet of the internal combustion engine system 10 and is configured to receive the exhaust from the internal combustion engine system 10. The first upstream exhaust conduit 103 is configured to direct the exhaust into downstream components of the aftertreatment system 100, including two parallel catalyst members. In some embodiments, the first upstream exhaust conduit 103 is coupled to (e.g., attached to, fixed to, welded to, fastened to, riveted to, etc.) the internal combustion engine system 10 (e.g., the first upstream exhaust conduit 103 is coupled to an outlet of the internal combustion engine system 10, etc.). In other embodiments, the first upstream exhaust conduit 103 is integrally formed with the internal combustion engine (e.g., the first upstream exhaust conduit 103 is integrally formed with an outlet of the internal combustion engine system 10, etc.).

The aftertreatment system 100 also includes a distributing housing 104 (e.g., pressure regulator, flow plenum, flow balancer, flow balancing system, etc.). The distributing housing 104 is fluidly coupled to the first upstream exhaust conduit 103 and is configured to receive the exhaust from the first upstream exhaust conduit 103. The distributing housing 104 divides the exhaust into a first portion and a second portion. In this way, the aftertreatment system 100 can desirably utilize two catalyst members.

The aftertreatment system 100 includes a second upstream exhaust conduit 105 (e.g., line, pipe, etc.). The second upstream exhaust conduit 105 is fluidly coupled to an outlet of the distributing housing 104 and is configured to receive the first portion of the exhaust from the distributing housing 104. The second upstream exhaust conduit 105 is configured to direct the exhaust into downstream components of the aftertreatment system 100.

The aftertreatment system 100 includes a first aftertreatment unit 112 (e.g., an exhaust filtration unit, etc.). The first aftertreatment unit 112 is positioned downstream of and fluidly coupled to the distributing housing 104. The first aftertreatment unit 112 includes a first aftertreatment component housing 106 and a first aftertreatment component 107 (e.g., an exhaust filtration device, etc.) disposed within the first aftertreatment component housing 106. In some embodiments, the first aftertreatment unit 112 is configured to remove or filter particulates, such as soot, from the exhaust flowing in the aftertreatment system 100 prior to the exhaust being provided to downstream components of the aftertreatment system 100. In some embodiments, the first aftertreatment component 107 is a particulate filter (e.g., a diesel particulate filter (DPF), etc.). The first aftertreatment unit 112 includes an inlet, where the first portion of the exhaust is received (e.g., from the distributing housing 104, etc.), and an outlet, where the exhaust exits after having particulates substantially filtered from the exhaust and/or converting the particulates into carbon dioxide.

In some embodiments, the first aftertreatment component housing 106 is fluidly coupled to the second upstream exhaust conduit 105. In some embodiments, the first aftertreatment component housing 106 is fastened (e.g., using a band, using bolts, etc.), welded, riveted, or otherwise attached to the second upstream exhaust conduit 105. In other embodiments, the first aftertreatment component housing 106 is integrally formed with the second upstream exhaust conduit 105. In some embodiments, the second upstream exhaust conduit 105 is omitted from the aftertreatment system 100 such that the first aftertreatment component housing 106 is fastened or integrally formed with the distributing housing 104.

The aftertreatment system 100 also includes a first decomposition housing 114 (e.g., decomposition reactor, hydrocarbon mixer, decomposition chamber, reactor pipe, decomposition tube, reactor tube, etc.). The first decomposition housing 114 is positioned downstream of and fluidly coupled to the first aftertreatment unit 112. The first decomposition housing 114 is configured to receive the first portion of the exhaust from the first aftertreatment unit 112. In some embodiments, the first decomposition housing 114 is fastened (e.g., using a band, using bolts, etc.), welded, riveted, or otherwise attached to the first aftertreatment component housing 106. In other embodiments, the first decomposition housing 114 is integrally formed with the first aftertreatment component housing 106.

The aftertreatment system 100 includes a reductant delivery system 116. In various embodiments, the reductant delivery system 116 is configured to facilitate the introduction of the reductant into the exhaust. The reductant delivery system 116 includes a first doser 118 (e.g., dosing module, etc.). The first doser 118 is configured to facilitate passage of the reductant through the first decomposition housing 114 and into the first decomposition housing 114. The first doser 118 is configured to receive the reductant, and in some embodiments, configured to receive air and the reductant, and provide the reductant and/or air-reductant mixture into the first decomposition housing 114 to facilitate treatment of the exhaust. The first doser 118 may include an insulator interposed between a portion of the first doser 118 and the portion of the first decomposition housing 114 on which the first doser 118 is mounted. In various embodiments, the first doser 118 is coupled (e.g., fluidly coupled) to the first decomposition housing 114.

The reductant delivery system 116 also includes a reductant source 120 (e.g., reductant tank, etc.). The reductant source 120 is configured to contain reductant. The reductant source 120 is fluidly coupled to the first doser 118 and configured to provide the reductant to the first doser 118. The reductant source 120 may include multiple reductant sources 120 (e.g., multiple tanks connected in series or in parallel, etc.). The reductant source 120 may be, for example, a diesel exhaust fluid tank containing Adblue®.

The reductant delivery system 116 also includes a first reductant pump 122 (e.g., supply unit, etc.). The first reductant pump 122 is fluidly coupled to the first doser 118 and configured to receive the reductant from the reductant source 120 and to provide the reductant to the first doser 118. The first reductant pump 122 is used to pressurize the reductant from the reductant source 120 for delivery to the first doser 118. In some embodiments, the first reductant pump 122 is pressure controlled (e.g., controlled to obtain a target pressure, etc.). In some embodiments, the first reductant pump 122 is coupled to a chassis of a vehicle associated with the aftertreatment system 100.

In some embodiments, the reductant delivery system 116 also includes a reductant filter 124. The reductant filter 124 is fluidly coupled to the reductant source 120 and the first reductant pump 122 and is configured to receive the reductant from the reductant source 120 and to provide the reductant to the first reductant pump 122. The reductant filter 124 filters (e.g., strains, etc.) the reductant prior to the reductant being provided to internal components (e.g., pistons, vanes, etc.) of the first reductant pump 122. For example, the reductant filter 124 may inhibit or prevent the transmission of solids (e.g., solidified reductant, contaminants, etc.) to the internal components of the first reductant pump 122. In this way, the reductant filter 124 may facilitate prolonged desirable operation of the first reductant pump 122.

The first doser 118 includes at least one first injector 126 (e.g., insertion device, etc.). The first injector 126 is configured to dose the reductant received by the first doser 118 into the exhaust (e.g., within the first decomposition housing 114, etc.).

In some embodiments, the reductant delivery system 116 also includes a first air pump 128 and an air source 130 (e.g., air intake, etc.). The first air pump 128 is fluidly coupled to the air source 130 and is configured to receive air from the air source 130. The first air pump 128 is fluidly coupled to the first doser 118 and is configured to provide the air to the first doser 118. The first doser 118 is configured to mix the air and the reductant into an air-reductant mixture and to provide the air-reductant mixture to the first injector 126 (e.g., for dosing into the first decomposition housing 114, etc.). In some of these embodiments, the reductant delivery system 116 also includes an air filter 132. The air filter 132 is fluidly coupled to the air source 130 and the first air pump 128 and is configured to receive the air from the air source 130 and to provide the air to the first air pump 128. The air filter 132 is configured to filter the air prior to the air being provided to the first air pump 128. In other embodiments, the reductant delivery system 116 does not include the first air pump 128 and/or the reductant delivery system 116 does not include the air source 130. In such embodiments, the first doser 118 is not configured to mix the reductant with air (e.g., the first doser 118 is a reductant-only doser, etc.).

The aftertreatment system 100 also includes a controller 134. The first doser 118, the first reductant pump 122, and the first air pump 128 are also electrically or communicatively coupled to the controller 134. The controller 134 is configured to control the first doser 118 to dose the reductant and/or the air-reductant mixture into the first decomposition housing 114. The controller 134 may also be configured to control the first reductant pump 122 and/or the first air pump 128 in order to control the reductant and/or the air-reductant mixture that is dosed into the first decomposition housing 114.

The controller 134 includes a processing circuit 136. The processing circuit 136 includes a processor 138 and a memory 140. The processor 138 may include a microprocessor, an application-specific integrated circuit (ASIC), a field-programmable gate array (FPGA), etc., or combinations thereof. The memory 140 may include, but is not limited to, electronic, optical, magnetic, or any other storage or transmission device capable of providing a processor, ASIC, FPGA, etc. with program instructions. The memory 140 may include a memory chip, Electrically Erasable Programmable Read-Only Memory (EEPROM), Erasable Programmable Read Only Memory (EPROM), flash memory, or any other suitable memory from which the controller 134 can read instructions. The instructions may include code from any suitable programming language. The memory 140 may include various modules that include instructions which are configured to be implemented by the processor 138.

In various embodiments, the controller 134 is configured to communicate with a central controller 141 (e.g., engine control unit (ECU), engine control module (ECM), etc.) of an internal combustion engine having the aftertreatment system 100. In some embodiments, the central controller 141 and the controller 134 are integrated into a single controller.

In some embodiments, the central controller 141 is communicable with a display device. The display device may be configured to change state in response to receiving information from the central controller 141. For example, the display device may be configured to change between a static state (e.g., displaying a green light, displaying a "SYSTEM OK" message, etc.) and an alarm state (e.g., displaying a blinking red light, displaying a "SERVICE NEEDED" message, etc.) based on a communication from the central controller 141. By changing state, the display device may provide an indication to a user (e.g., operator, etc.) of a status (e.g., operation, in need of service, etc.) of the reductant delivery system 116.

The aftertreatment system 100 also includes a second aftertreatment unit 146 (e.g., a SCR catalyst member, etc.). The second aftertreatment unit 146 includes a second aftertreatment component housing 108 and a second aftertreatment component 109 coupled to the second aftertreatment component housing 108. In some embodiments, the second aftertreatment component 109 is a catalyst substrate (e.g., a SCR catalyst substrate, etc.). In some embodiments, the second aftertreatment component 109 is integrally formed with the second aftertreatment component housing 108. The second aftertreatment unit 146 and fluidly coupled to the first decomposition housing 114 and configured to receive the first portion of the exhaust from the first decomposition housing 114. In some embodiments, the second aftertreatment component housing 108 is fastened (e.g., using a band, using bolts, etc.), welded, riveted, or otherwise attached to the first decomposition housing 114. In some embodiments, the second aftertreatment component housing 108 is integrally formed with the first decomposition housing 114.

The second aftertreatment unit 146 is configured to cause decomposition of the exhaust using the reductant. The second aftertreatment unit 146 is positioned downstream of the first decomposition housing 114. As a result, the reductant is injected by the first injector 126 upstream of the second aftertreatment unit 146 such that the second aftertreatment unit 146 is configured to receive a mixture of the reductant and exhaust. The reductant droplets undergo the processes of evaporation, thermolysis, and hydrolysis to form non-NOx emissions within the first decomposition housing 114 and/or the second aftertreatment unit 146.

The second aftertreatment unit 146 is configured to assist in the reduction of NOx emissions by accelerating a NOx reduction process between the reductant and the NOx of the exhaust into diatomic nitrogen, water, and/or carbon dioxide. The second aftertreatment unit 146 includes an inlet fluidly coupled to the first decomposition housing 114 from which exhaust and reductant are configured to be received and an outlet fluidly coupled to an end (e.g., tailpipe, etc.) of the aftertreatment system 100 which provides the exhaust to atmosphere. In some embodiments, referring back to FIG. 1, the first aftertreatment unit 112, the first decomposition housing 114, and the second aftertreatment unit 146 are centered on a first longitudinal axis A1. As used herein, the term "axis" describes a theoretical line extending through the centroid (e.g., center of mass, geometric center, etc.) of an object. The object is centered on the axis. The object is not necessarily cylindrical (e.g., a non-cylindrical shape may be centered on an axis, etc.).

The aftertreatment system 100 further includes a first differential pressure (DP) sensor 162 and a second DP sensor 164. The first DP sensor 162 is configured to measure (e.g., determine, provide, etc.) a signal associated with a differential pressure across the first aftertreatment unit 112, and the second DP sensor 164 is configured to measure (e.g., determine, provide, etc.) a signal associated with a differential pressure across the first decomposition housing 114 and the second aftertreatment unit 146. The first DP sensor 162 and the second DP sensor 164 are each electrically or communicatively coupled to the controller 134, which is configured to determine a differential pressure based on signals provided by each of the first DP sensor 162 and the second DP sensor 164.

The first DP sensor 162 includes a first sensor first inlet 162A (e.g., high port, upstream inlet, etc.) and a first sensor second inlet 162B (e.g., low port, downstream inlet, etc.) positioned downstream of the first sensor first inlet 162A. The first sensor first inlet 162A is configured to receive the exhaust at or near an inlet of the first aftertreatment unit 112 and subsequently measure a first sensor first signal associated with a first pressure of the exhaust at or near the inlet of the first aftertreatment unit 112. The first sensor second inlet 162B is configured to receive the exhaust at or near an outlet of the first aftertreatment unit 112 and subsequently measure a first sensor second signal associated with a second pressure of the exhaust at or near the outlet of the first aftertreatment unit 112. In various embodiments, the first sensor second inlet 162B is configured to measure the first sensor second signal associated with the second pressure of the exhaust downstream the outlet of the first aftertreatment unit 112, such as at or near an inlet of the first decomposition housing 114, which is positioned downstream of the outlet of the first aftertreatment unit 112.

Based on the first sensor first signal and the first sensor second signal received from the first DP sensor 162, the controller 134 can determine the differential pressure across the first aftertreatment unit 112. In some embodiments, the first pressure of the exhaust is attributed to the particulates present in the exhaust accumulating onto the first aftertreatment component 107 After passing through the first aftertreatment component 107, at least a portion of the particulates is removed from the exhaust, resulting in the exhaust to have the second pressure that is lower than the first pressure. Accordingly, a difference between the first pressure and the second pressure, i.e., the differential pressure across the first aftertreatment unit 112, is indicative of the extent of particulate removal accomplished by the first aftertreatment component 107.

Similarly, the second DP sensor 164 includes a second sensor first inlet 164A (e.g., high port, upstream inlet, etc.) and a second sensor second inlet 164B (e.g., low port, downstream inlet, etc.) positioned downstream of the second sensor first inlet 164A. The second sensor first inlet 164A is configured to receive the exhaust at or near the inlet of the first decomposition housing 114 and subsequently measure a second sensor first signal associated with a first pressure of the exhaust at or near the inlet the first decomposition housing 114. The second sensor second inlet 164B is configured to receive the exhaust at or near an outlet of the second aftertreatment unit 146 and subsequently measure a second sensor second signal associated with a second pressure of the exhaust at or near the outlet of the second aftertreatment unit 146.

Based on the second sensor first signal and the second sensor second signal received from the second DP sensor 164, the controller 134 can determine the differential pressure across the first decomposition housing 114 and the second aftertreatment unit 146. The differential pressure determined based on the signals of the first DP sensor 162 and the differential pressure determined based on the signals of the second DP sensor 164 can be utilized to further determine the backpressure of the exhaust flowing through the aftertreatment system 100, which correlates with flow conditions of the exhaust within the aftertreatment system 100.

Figure 2:
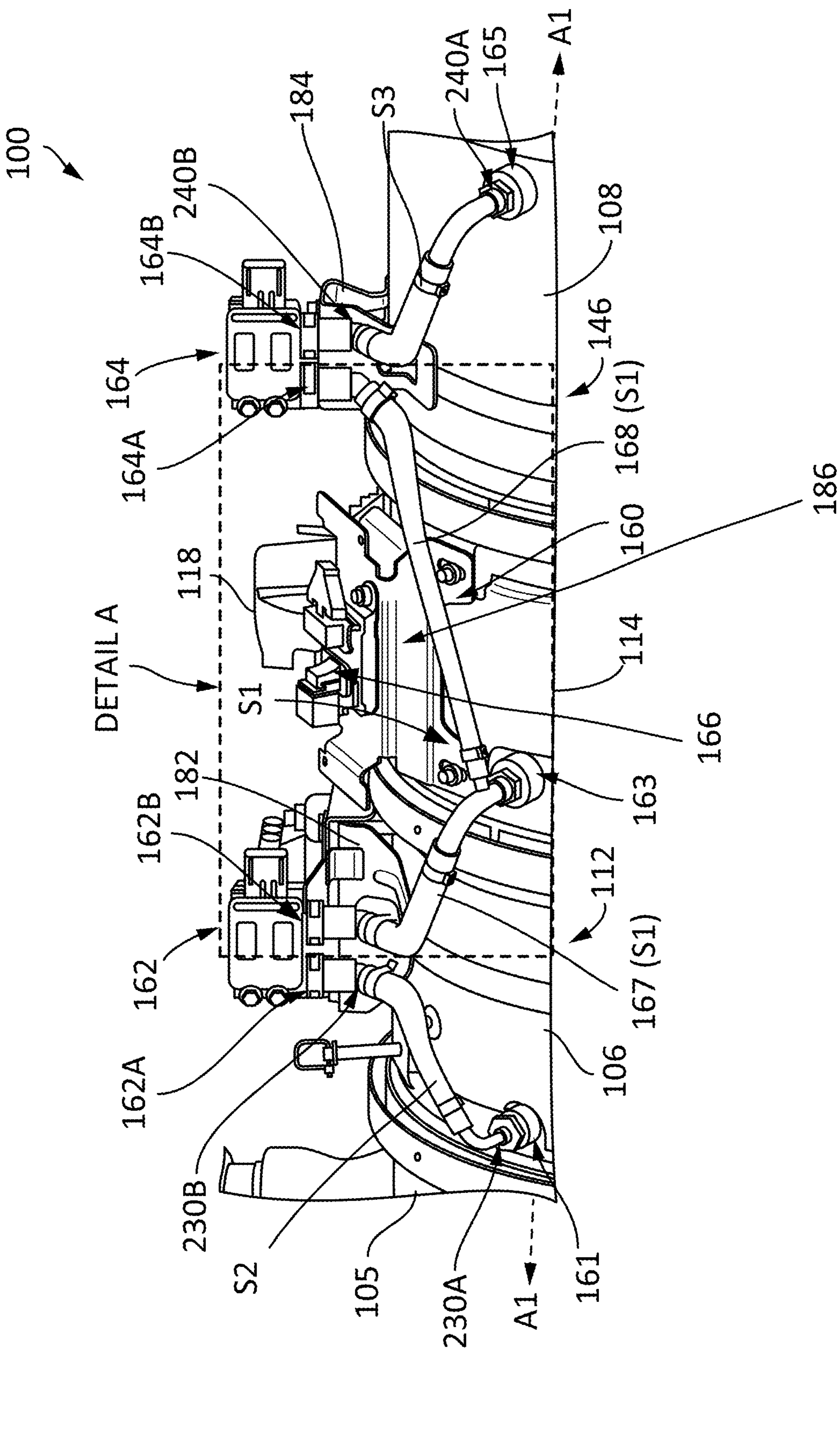
FIG. 2 is a schematic diagram of a portion of an example aftertreatment system.

FIG. 2 illustrates an example arrangement of the aftertreatment system 100 including the first DP sensor 162 and the second DP sensor 164 according to some embodiments. For example, in some embodiments, the aftertreatment system 100 includes a first sensor table 182 and a second sensor table 184. The first sensor table 182 is fastened (e.g., using a band, using bolts, etc.), welded, riveted, or otherwise attached to an exterior surface of the first aftertreatment component housing 106. Similarly, the second sensor table 184 is fastened, welded, riveted, or otherwise attached to an exterior surface of the second aftertreatment component housing 108. The first DP sensor 162 and the second DP sensor 164 are in turn fastened or otherwise attached to the first sensor table 182 and the second sensor table 184, respectively.

In some embodiments, the aftertreatment system 100 includes a sensor 166 configured to measure a signal corresponding to a concentration of NOx. The aftertreatment system 100 may further include a sensor support bracket 186 fastened, welded, riveted, or otherwise attached to an exterior surface of the decomposition housing 114. The sensor 166 is in turn fastened or otherwise attached to the sensor support bracket 186. In addition to attaching the sensor 166 onto the first aftertreatment component housing 106, the sensor support bracket 186 may also be configured to lower a temperature the sensor 166 experiences during operation of the aftertreatment system 100.

Referring to FIGS. 1 and 2 collectively, the aftertreatment system 100 further includes a first pressure tube assembly 160. The first pressure tube assembly 160 includes a plurality of pressure tube segments configured to facilitate the measurement of the differential pressure within the aftertreatment system 100 using the first DP sensor 162 and the second DP sensor 164. For example, the pressure tube segments of the first pressure tube assembly 160 are each configured to establish fluid communication (e.g., by providing the exhaust through the pressure tube segment, etc.) between each component (e.g., the first aftertreatment unit 112, the first decomposition housing 114, and the second aftertreatment unit 146, etc.) of the aftertreatment system 100 and the inlets of the first DP sensor 162 or the inlets of the second DP sensor 164.

The first pressure tube assembly 160 includes a first pressure tube segment S1 configured as a branched segment (e.g., having a split structure, having a "Y"-shaped structure, etc.) having a first subsegment 167 coupled to (e.g., welded to, attached to, integrally formed with, etc.) a second subsegment 168. The first subsegment 167 is in fluid communication with the first sensor second inlet 162B of the first DP sensor 162 and an interior of the first decomposition housing 114. In various embodiments, the first decomposition housing 114 includes a first decomposition housing port 163 configured to provide fluid communication between the interior of the first decomposition housing 114 and an exterior component, such as the first subsegment 167 and the second subsegment 168. As such, the exhaust present in the first decomposition housing 114 can be sampled (or measured) by the first DP sensor 162 through the first subsegment 167. In some embodiments, the first decomposition housing port 163 is positioned at or near the inlet of the first decomposition housing 114.

The second subsegment 168 is in fluid communication with the second sensor first inlet 164A of the second DP sensor 164 and the interior of the first decomposition housing 114 through the first decomposition housing port 163. In this regard, the exhaust present in the first decomposition housing 114 (e.g., at or near the inlet of the first decomposition housing 114) can be sampled (or measured) by the second DP sensor 164 through the second subsegment 168. In this regard, the pressure of the exhaust measured at the first decomposition housing port 163 serves as a common reference pressure for determining the differential pressure across the first aftertreatment unit 112 using the first DP sensor 162 and the differential pressure across the first decomposition housing 114 and the second aftertreatment unit 146 using the second DP sensor 164.

Figure 3:
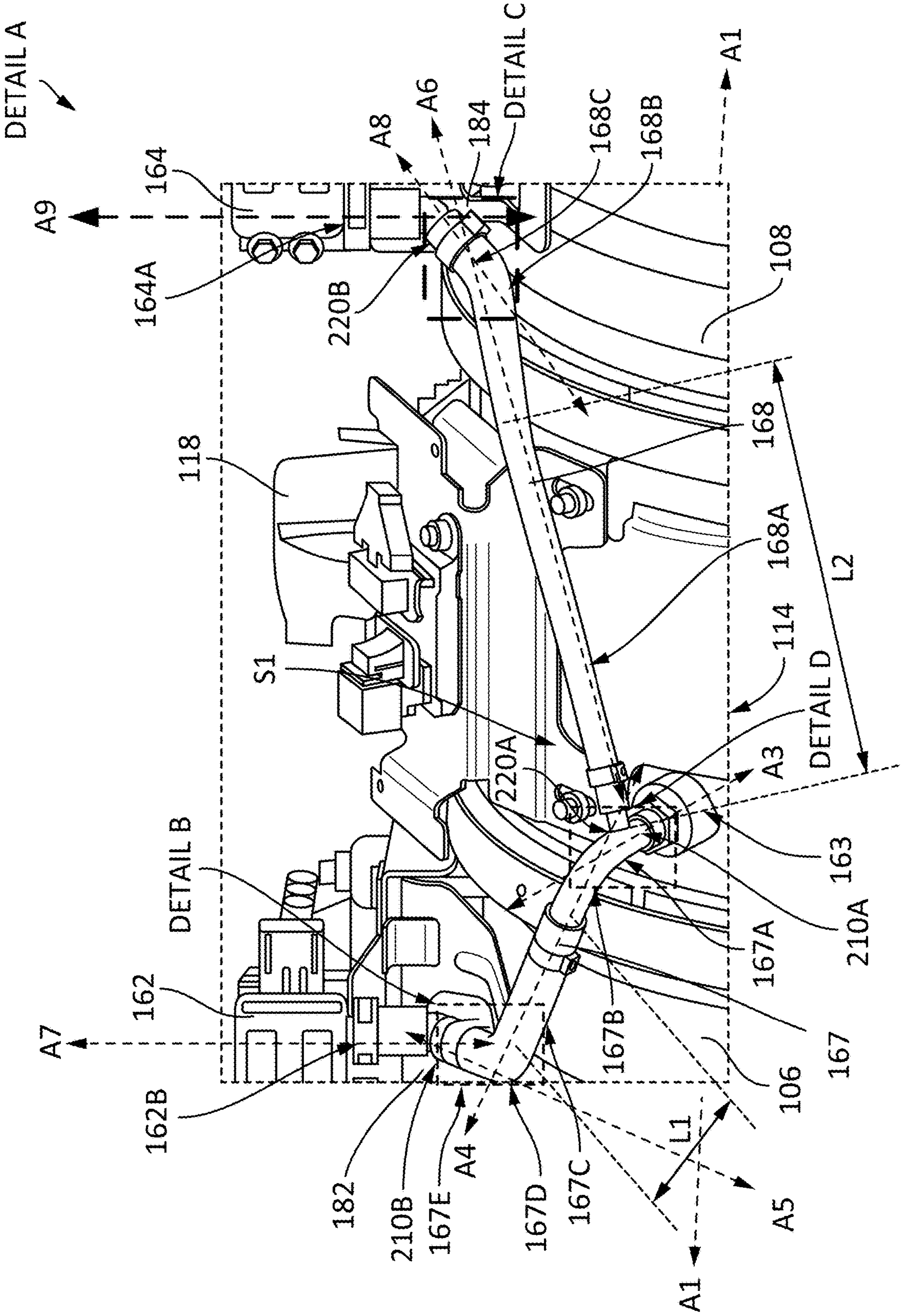
FIG. 3 is a view of Detail A shown in FIG. 2.
Figure 7:
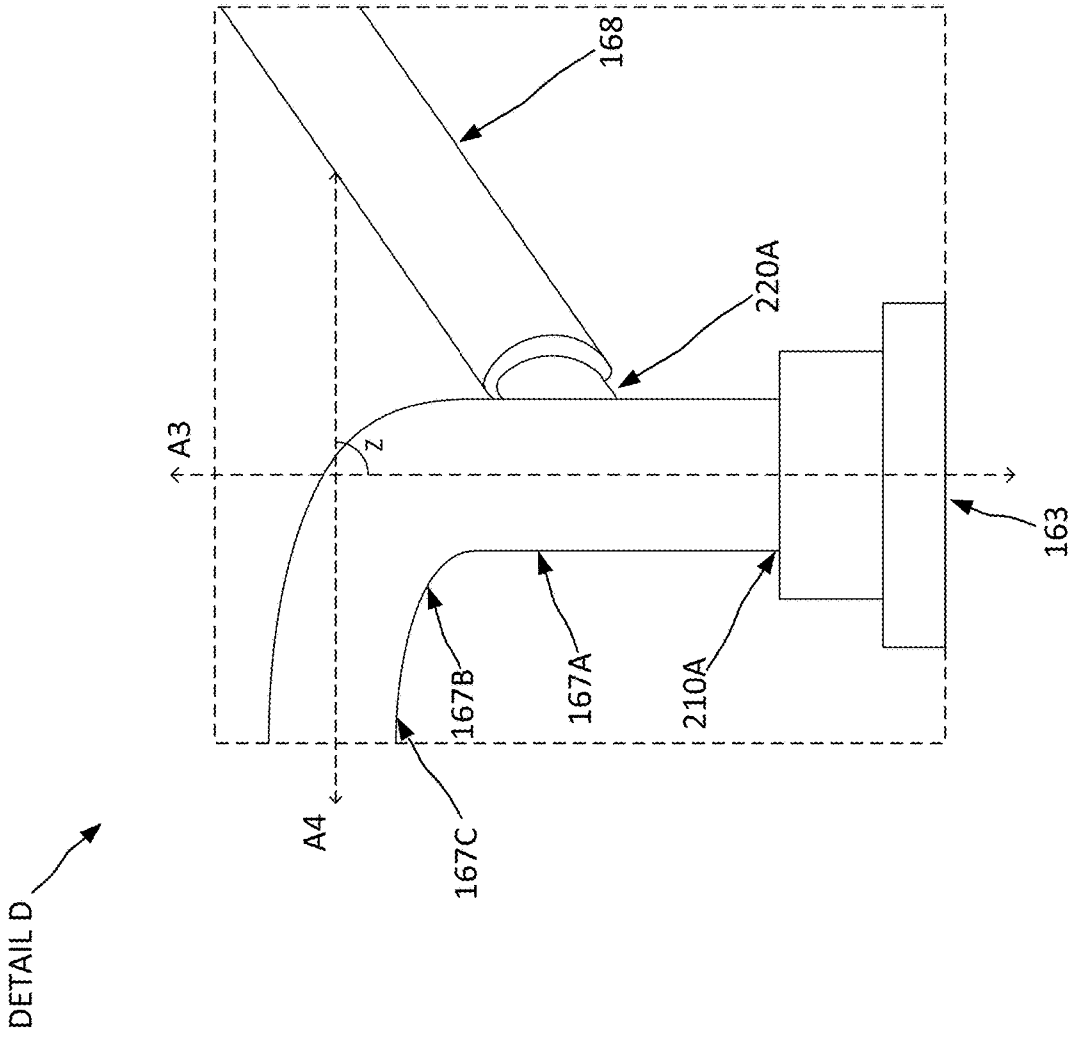
FIG. 7 is another view of Detail D shown in FIG. 3.

Referring to FIG. 3, which illustrates a view of DETAIL A in FIG. 2, the first subsegment 167 includes a first end 210A and a second end 210B opposite the first end 210A. The first end 210A is fluidly coupled to the first decomposition housing port 163 and the second end 210B is fluidly coupled to the first sensor second inlet 162B of the first DP sensor 162. The first subsegment 167 includes a first straight portion 167A extending from the first end 210A and along an axis A3. In some embodiments, the axis A3 extends radially from the first longitudinal axis A1. The first subsegment 167 includes a first curved portion 167B extending between and coupled to both the first straight portion 167A and a second straight portion 167C. The second straight portion 167C extends along an axis A4 that is substantially non-parallel to the axis A3, such that an angle (e.g., angle Z in FIG. 7) between the axes A3 and A4 is non-zero.

While one or more portions of the first subsegment 167 are described herein as extending along axes that are substantially straight, it is noted that such descriptions are only intended to illustrate example configurations of the first subsegment 167 and not to limit the embodiments of the first subsegment 167 in the present disclosure. For example, these portions of the first subsegment 167 may be curved and therefore may not extend along an axis.

Figure 4:
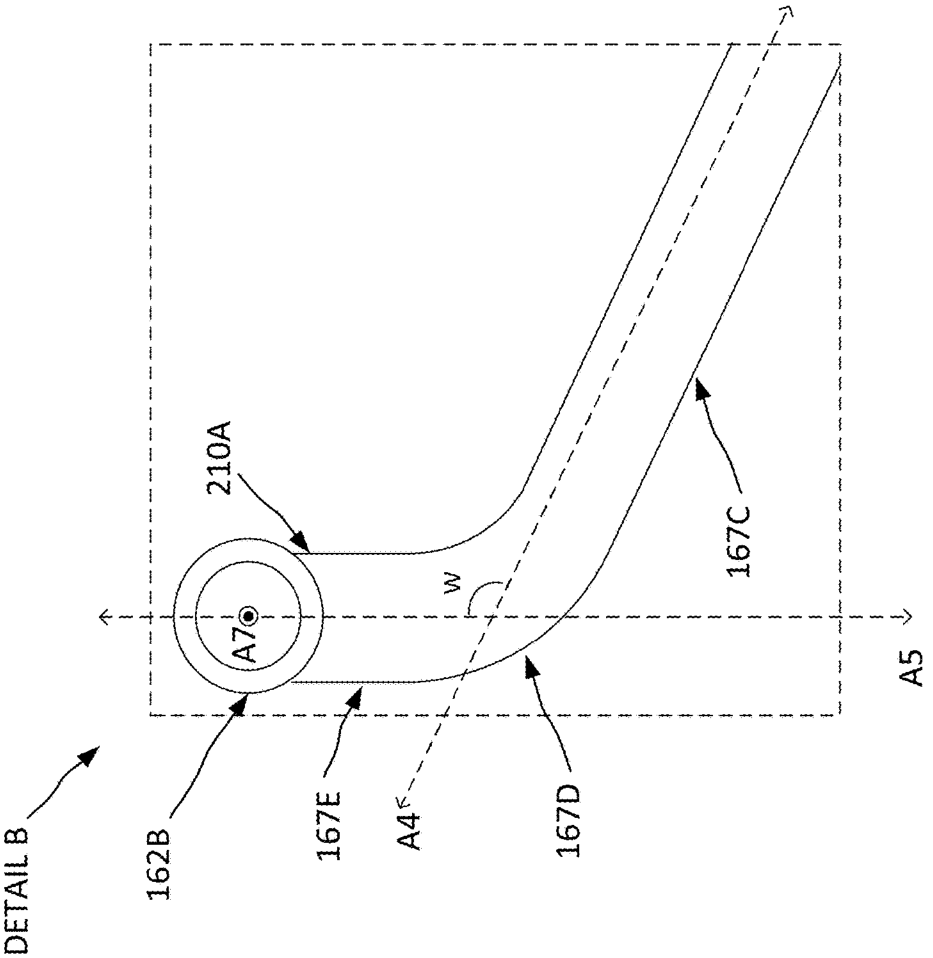
FIG. 4 is a view of Detail B shown in FIG. 3.

Referring to FIG. 3 and further to FIG. 4, which illustrates a view of DETAIL B in FIG. 3, the first subsegment 167 also includes a second curved portion 167D extending between and coupled to both the second straight portion 167C and a third straight portion 167E. The third straight portion 167E extends along an axis A5 that is substantially non-parallel to the axis A4. In some embodiments, an angle W between the axes A4 and A5 is greater than approximately 90°, such as in a range of approximately 100° to approximately 140°, inclusive. The third straight portion 167E is fluidly coupled to the first sensor second inlet 162B, which extends along an axis A7 that is substantially non-parallel to each of the axes A4 and A5. In some embodiments, the axis A7 is substantially perpendicular to the first longitudinal axis A1.

Figure 8:
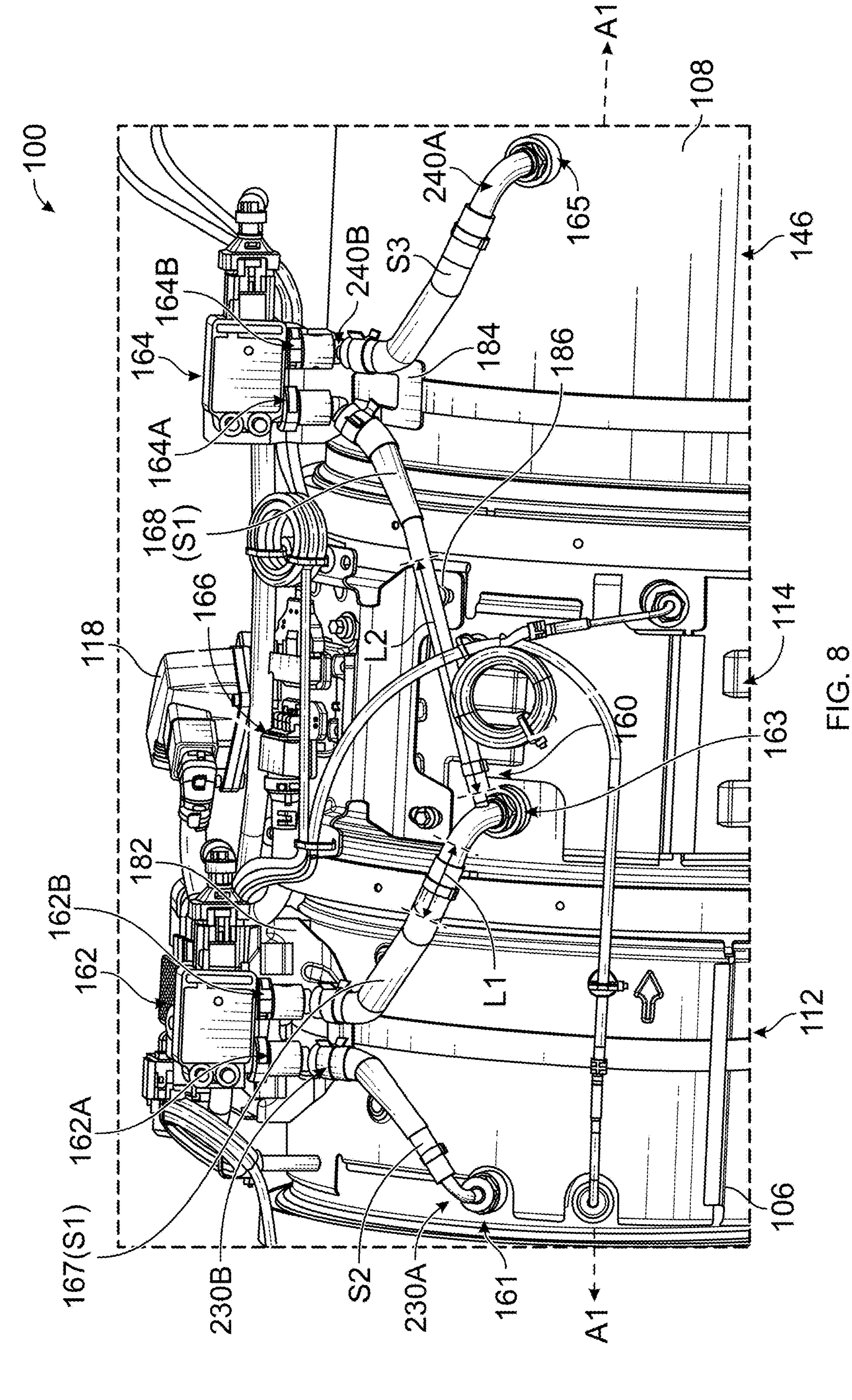
FIG. 8 is a schematic diagram of a portion of an example aftertreatment system.

Still referring to FIG. 3, the second subsegment 168 includes a first end 220A and a second end 220B opposite the first end 220A. The first end 220A is fluidly coupled to the first decomposition housing port 163 (e.g., through the first straight portion 167A of the first subsegment 167, etc.) and the second end 220B is fluidly coupled to the second sensor first inlet 164A of the second DP sensor 164. The second subsegment 168 includes a first straight portion 168A extending from the first end 220A and along an axis A6. In some embodiments, the first straight portion 167A of the first subsegment 167 has a first length L1 and the first straight portion 168A of the second subsegment 168 has a second length L2. In some embodiments, the first length L1 and the second length L2 each vary according to orientation and installation of the first sensor table 182 and/or the second sensor table 184. In some embodiments, the second length L2 is greater than the first length L1, such as that depicted in FIG. 3. In a similar example depicted in FIG. 8, which shows another embodiment of the aftertreatment system 100, the second length L2 is greater than the first length L1. In some embodiments, the second length L2 is less than the first length L1. In some embodiments, the first length L1 is in a range of approximately 25 mm to approximately 1500 mm, and the second length L2 is in a range of approximately 25 mm to approximately 1500 mm. The values of the first length L1 and the second length L2 are for illustrative purposes only and not intended to limit the embodiments of the present disclosure.

Figure 5:
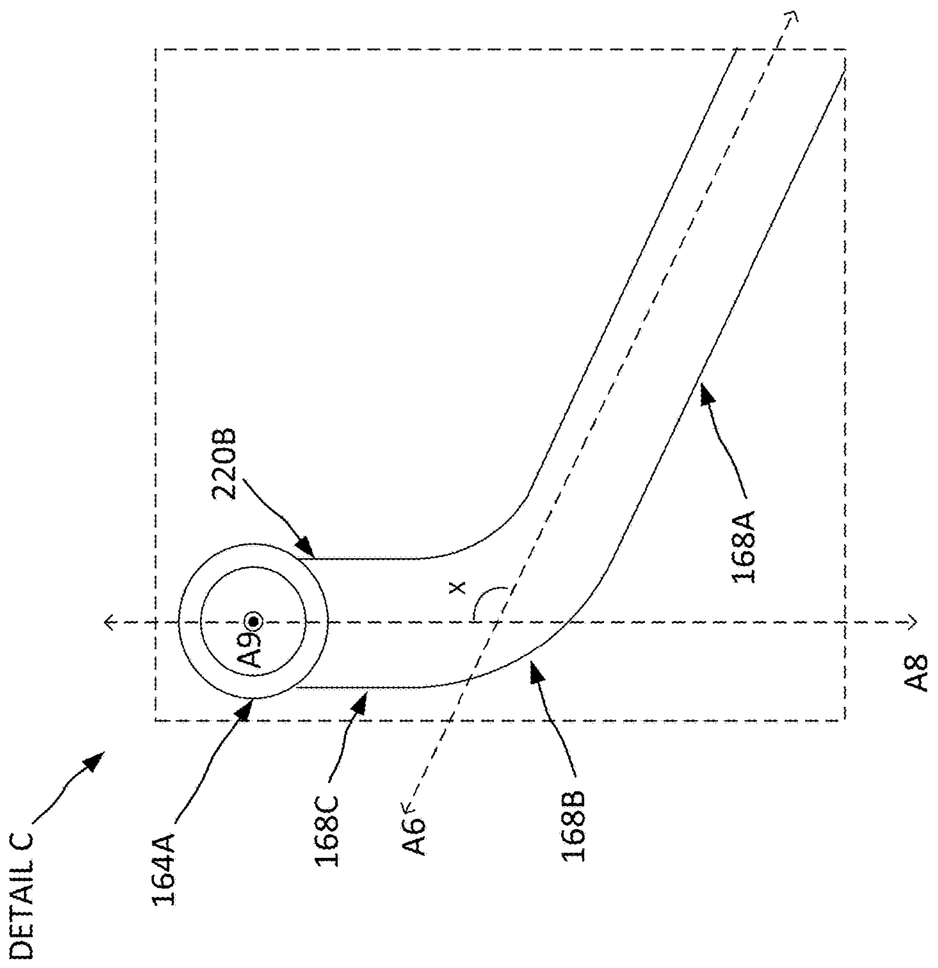
FIG. 5 is a view of Detail C shown in FIG. 3.

Referring to FIG. 3 and further to FIG. 5, which illustrates a view of DETAIL C in FIG. 3, the second subsegment 168 further includes a curved portion 168B and coupled to both the first straight portion 168A and a second straight portion 168C. The second straight portion 168C is coupled to the second sensor first inlet 164A and extends along an axis A8 that is substantially non-parallel to the axis A6. The second sensor first inlet 164A extends along an axis A9 that is substantially non-parallel to each of the axes A6 and A8. In some embodiments, an angle X between the axes A6 and A8 is greater than approximately 90°, such as in a range of approximately 100° to approximately 140°, inclusive. In some embodiments, the axis A9 is substantially perpendicular to the first longitudinal axis A1 (i.e., substantially parallel to the axis A7).

While one or more portions of the second subsegment 168 are described herein as extending along axes that are substantially straight, it is noted that such descriptions are only intended to illustrate example configurations of the second subsegment 168 and not to limit the embodiments of the second subsegment 168 in the present disclosure. For example, these portions of the second subsegment 168 may be curved and therefore may not extend along an axis.

Figure 6:
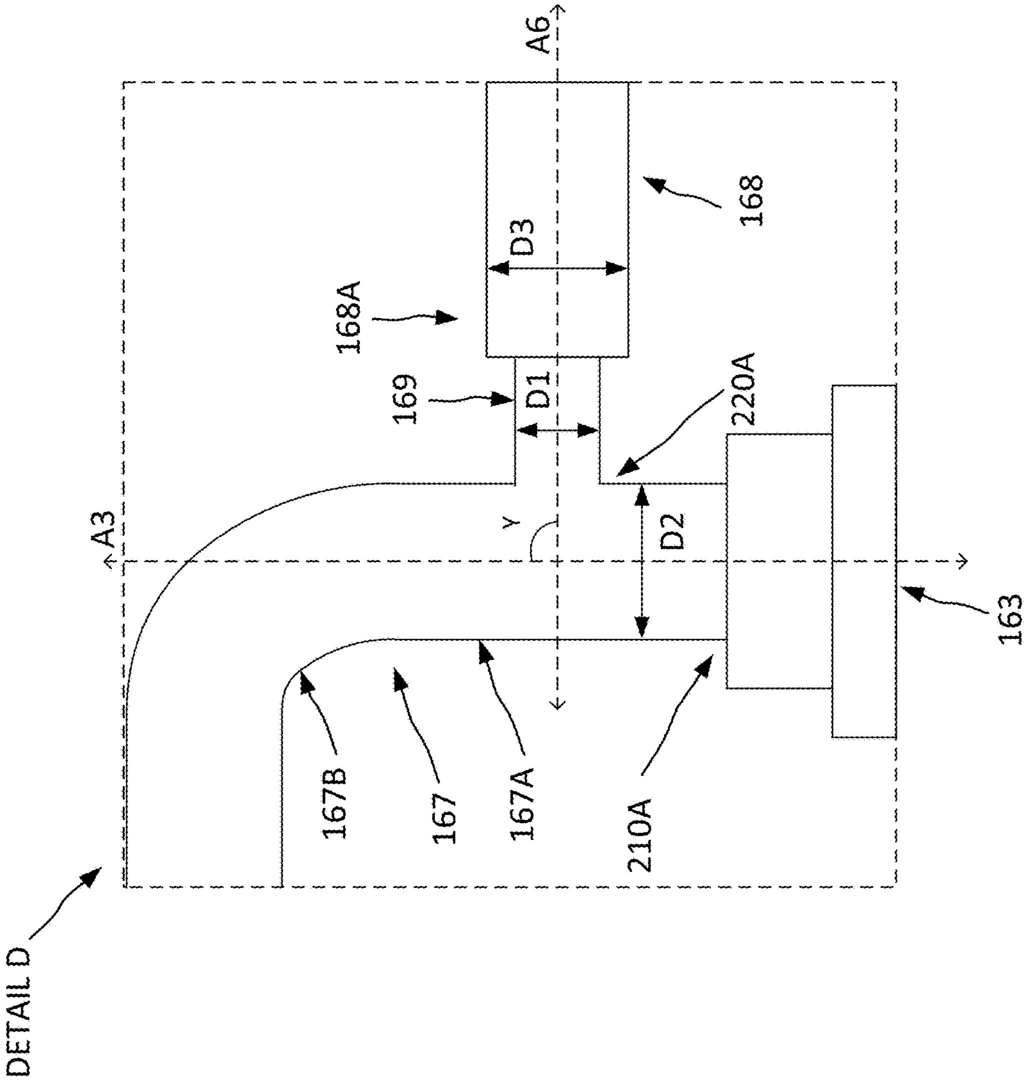
FIG. 6 is a view of Detail D shown in FIG. 3.

Referring to FIG. 3 and further to FIG. 6, which illustrates DETAIL D in FIG. 3 viewed in a first plane defined by the first straight portion 167A and the first straight portion 168A, the first straight portion 168A of the second subsegment 168 joins the first straight portion 167A of the first subsegment 167 at the first straight portion 167A. In some embodiments, the first straight portion 168A includes a junction segment 169 fluidly coupled to the first straight portion 167A at the first end 220A. The first straight portion 168A (including the junction segment 169) extends along the axis A6, where the axes A3 and A6 are substantially perpendicularly to one another and an angle Y between the axes A6 and A3 is approximately 90°. Furthermore, referring to FIG. 7, which illustrates the DETAIL D in FIG. 3 viewed in a second plane defined by the first straight portion 167A, the first curved portion 167B, and the second straight portion 167C, an angle Z between the axes A3 and A4 is approximately 90°. The values of the various angles, such as the angles W, X, Y, and Z, are for illustrative purposes only and not intended to limit the embodiments of the present disclosure.

Still referring to FIG. 6, the junction segment 169 is defined by a first diameter D1, the first straight portion 167A is defined by a second diameter D2, and the first straight portion 168A is defined by a third diameter D3. As depicted herein, the first diameter D1, the second diameter D2, and the third diameter D3 each represent an inner diameter of a portion of their respective segment or subsegment. In some embodiments, one or more of the first diameter D1, the second diameter D2, and the third diameter D3 vary along a length of their respective segment or subsegment. For example, the first diameter D1 may vary along a length of the junction segment 169, the second segment D2 may vary along a length of the first straight portion 167A of the first subsegment 167, and/or the third diameter D3 may vary along a length of the second first straight portion 168A of the second subsegment 168. In some embodiments, one or more of the first diameter D1, the second diameter D2, and the third diameter D3 is substantially constant along a length of their respective segment or subsegment. In some embodiments, the first diameter D1 is less than each of the second diameter D2 and the third diameter D3. In some embodiments, the second diameter D2 and the third diameter D3 are approximately the same. In the embodiment of FIG. 6 depicting the junction segment 169, the first subsegment 167, and the second subsegment 168, the first diameter D1 is in a range of approximately 2.5 mm to approximately 20 mm; the second diameter D2 is in a range of approximately 2.5 mm to approximately 20 mm; and the third diameter D3 is in a range of approximately 3.0 mm to approximately 25 mm. These values of the first diameter D1, the second diameter D2, and the third diameter D3 are for illustrative purposes only and not intended to limit the embodiments of the present disclosure.

In some embodiments, the first subsegment 167 is integrally formed with the second subsegment 168, resulting in the first pressure tube segment S1. For example, the first subsegment 167 and the second subsegment 168 may be cast as a monolithic structure. In other embodiments, the second subsegment 168 is welded, fastened, joined, or otherwise attached to the first subsegment 167 by coupling the junction segment 169 to the first straight portion 167A.

The first pressure tube assembly 160 also includes a second pressure tube segment S2 in fluid communication with the first sensor first inlet 162A of the first DP sensor 162 and an interior of the first aftertreatment unit 112. In various embodiments, the first aftertreatment component housing 106 includes a first aftertreatment component housing port 161 configured to provide fluid communication between the interior of the first aftertreatment unit 112 and an exterior component, such as the first sensor first inlet 162A, through the second pressure tube segment S2. Accordingly, the exhaust present in the first aftertreatment unit 112 (e.g., at the or near an inlet of the first aftertreatment unit 112) can be sampled (or measured) by the first DP sensor 162 through the second pressure tube segment S2. The second pressure tube segment S2 includes a first end 230A and a second end 230B opposite the first end 230A. The first end 230A is fluidly coupled to the first aftertreatment component housing port 161, and the second end 230B is fluidly coupled to the first sensor first inlet 162A.

The first pressure tube assembly 160 further includes a third pressure tube segment S3 in fluid communication with the second sensor second inlet 164B of the second DP sensor 164 and an interior of the second aftertreatment unit 146. In various embodiments, the second aftertreatment component housing 108 includes a second aftertreatment component housing port 165 configured to provide fluid communication between the interior of the second aftertreatment unit 146 and an exterior component, such as the second sensor second inlet 164B, through the third pressure tube segment S3. As such, the exhaust present in the second aftertreatment unit 146 (e.g., at the or near the outlet of the second aftertreatment unit 146) can be sampled (or measured) by the second DP sensor 164 through the third pressure tube segment S3. The third pressure tube segment S3 includes a first end 240A and a second end 240B opposite the first end 240A. The first end 240A is fluidly coupled to the second aftertreatment component housing port 165, and the second end 230B is fluidly coupled to the second sensor second inlet 162B.

In some embodiments, at least a portion of the first pressure tube segment S1, the second pressure tube segment S2, and the third pressure tube segment S3 are made from a metal, such as a pure metal, an alloy, or the like. In some embodiments, the first pressure tube segment S1, the second pressure tube segment S2, and the third pressure tube segment S3 are made from the same material.

In various embodiments, the use of a branched (e.g., split, "Y"-shaped, etc.) pressure tube segment, such as the first pressure tube segment S1, allows the differential pressure across the first aftertreatment unit 112 and the second aftertreatment unit 146 to be determined based on a common pressure source measured through the first decomposition housing port 163 (i.e., a common pressure port). As described in detail herein, the common pressure source corresponds to the pressure of the exhaust sampled by each of the first DP sensor 162 and the second DP sensor 164 at or near the inlet of the first decomposition housing 114 through the first decomposition housing port 163. For example, the first decomposition housing port 163 fluidly coupled to the first pressure tube segment S1 facilitates the measurement of a reference pressure against the pressure measured at the first aftertreatment component housing port 161 (e.g., at or near the inlet of the first aftertreatment unit 112) and against the pressure measured at the second aftertreatment component housing port 165 (e.g., at or near the outlet of the second aftertreatment unit 146). As such, the branched pressure tube segment eliminates one of the pressure ports needed to be installed, thereby reducing the breaching of the components of the aftertreatment system 100.

Furthermore, reducing the number of pressure ports needed also decreases the amount and/or the location of the physical space (i.e., the space claim) occupied by the pressure ports and the corresponding pressure tube assembly (e.g., the first pressure tube assembly 160). In this way, an overall packaging size of the aftertreatment system 100 may be reduced without impacting, or substantially impacting, the design and operation of the aftertreatment system 100.

In various embodiments, the pressure tube assembly (e.g., the first pressure tube assembly 160) having a branched pressure tube segment (e.g., the first pressure tube segment S1) described herein is applicable to aftertreatment systems in which multiple DP sensors are installed adjacent to one another, within a limited amount of physical space, and/or at limited choices of physical locations. Such arrangement may be desirable for aftertreatment systems that include two parallel catalyst members (e.g., the second aftertreatment unit 146 described above and fourth aftertreatment unit 154 described below), which may cause the exhaust to have different flow conditions (e.g., backpressure). In this regard, for at least the purpose of monitoring flow conditions within such an aftertreatment system (e.g., the aftertreatment system 100), additional DP sensors (e.g., the second DP sensor 164) may be included for determining a DP across downstream components (e.g., the first decomposition housing 114, the second aftertreatment unit 146, etc.) of the aftertreatment system. In some instances, installing the additional DP sensor may increase the space claim needed for the aftertreatment system. By utilizing the pressure tube assembly provided herein, however, the space claim associated with the additional DP sensor can be reduced, improving the integration and ease of installation of the multiple DP sensors within the limited space claim of the aftertreatment systems. In some embodiments, the DP sensors and the pressure tube assembly described herein can be used in an aftertreatment system having two parallel catalyst members as described above. In some embodiments, the DP sensors and the pressure tube assembly described herein can also be used in an aftertreatment system having one catalyst member.

Referring again to FIG. 1, the aftertreatment system 100 includes a third upstream exhaust conduit 110 (e.g., line, pipe, etc.). The third upstream exhaust conduit 110 is fluidly coupled to an outlet of the distributing housing 104 and is configured to receive the second portion of the exhaust from the distributing housing 104. The third upstream exhaust conduit 110 is configured to direct the exhaust into downstream components of the aftertreatment system 100.

The aftertreatment system 100 further includes a third aftertreatment unit 115 (e.g., an exhaust filtration unit, etc.). The third aftertreatment unit 115 is positioned downstream of the distributing housing 104. The third aftertreatment unit 115 includes a third aftertreatment component housing 111 and a third aftertreatment component 113 (e.g., an exhaust filtration device, etc.) disposed within the third aftertreatment component housing 111. The third aftertreatment unit 115 is configured to remove or filter particulates, such as soot, from the exhaust flowing in the aftertreatment system 100 prior to the exhaust being provided to downstream components of the aftertreatment system 100. in some embodiments, the third aftertreatment component 113 includes a particulate filter (e.g., a DPF, etc.). The third aftertreatment unit 115 includes an inlet, where the first portion of the exhaust is received (e.g., from the distributing housing 104, etc.), and an outlet, where the exhaust exits after having particulates substantially filtered from the exhaust and/or converting the particulates into carbon dioxide.

In some embodiments, the third aftertreatment component housing 111 is fluidly coupled to the third upstream exhaust conduit 110. In some embodiments, the third aftertreatment component housing 111 is fastened (e.g., using a band, using bolts, etc.), welded, riveted, or otherwise attached to the third upstream exhaust conduit 110. In other embodiments, the third aftertreatment component housing 111 is integrally formed with the third upstream exhaust conduit 110. In some embodiments, the third upstream exhaust conduit 110 is omitted from the aftertreatment system 100 such that the third aftertreatment component housing 111 is fastened or integrally formed with the distributing housing 104.

The aftertreatment system 100 further includes a second decomposition housing 152 (e.g., decomposition reactor, decomposition chamber, reactor pipe, decomposition tube, reactor tube, etc.). The second decomposition housing 152 is positioned downstream of and fluidly coupled to the third aftertreatment component housing 111. The second decomposition housing 152 is configured to receive the second portion of the exhaust from the third aftertreatment unit 115. In some embodiments, the second decomposition housing 152 is fastened (e.g., using a band, using bolts, etc.), welded, riveted, or otherwise attached to the third aftertreatment component housing 111. In other embodiments, the second decomposition housing 152 is integrally formed with the third aftertreatment component housing 111.

The reductant delivery system 116 also includes a second doser 145 (e.g., dosing module, etc.). The second doser 145 is mounted on the second decomposition housing 152. As is explained in more detail herein, the second doser 145 is configured to receive reductant, and in some embodiments, configured to receive air and reductant, and provide the reductant and/or the air-reductant mixture into the aftertreatment system 100 to facilitate treatment of the exhaust.

In various embodiments, the first doser 118 is configured to receive air and reductant and provides the air-reductant mixture into the first decomposition housing 114 and the second doser 145 configured to receive reductant (and does not receive air) and provides the reductant into the second decomposition housing 152. In various embodiments, the first doser 118 is configured to receive reductant (and does not receive air) and provides the reductant into the first decomposition housing 114 and the second doser 145 configured to receive air and reductant and provides the air-reductant mixture into the second decomposition housing 152. In various embodiments, the first doser 118 is configured to receive reductant (and does not receive air) and provides the reductant into the first decomposition housing 114 and the second doser 145 is configured to receive reductant (and does not receive air) and provides the reductant into the second decomposition housing 152. In various embodiments, the first doser 118 is configured to receive receives air and reductant and provides the air-reductant mixture into the first decomposition housing 114 and the second doser 145 is configured to receive air and reductant and provides the air-reductant mixture into the second decomposition housing 152.

The second doser 145 may include an insulator interposed between a portion of the second doser 145 and the portion of the second decomposition housing 152 on which the second doser 145 is mounted. The second doser 145 is fluidly coupled to the reductant source 120.

The reductant delivery system 116 also includes a second reductant pump 147 (e.g., supply unit, etc.). The second reductant pump 147 is fluidly coupled to the reductant source 120 and is configured to receive the reductant from the reductant source 120. The second reductant pump 147 is used to pressurize the reductant from the reductant source 120 for delivery to the second doser 145. In some embodiments, the second reductant pump 147 is pressure controlled (e.g., controlled to obtain a target pressure, etc.).

In embodiments where the reductant delivery system 116 includes the reductant filter 124, the second reductant pump 147 may be configured to receive the reductant from the reductant filter 124. The reductant filter 124 filters the reductant prior to the reductant being provided to internal components of the second reductant pump 147. For example, the reductant filter 124 may inhibit or prevent the transmission of solids to the internal components of the second reductant pump 147. In this way, the reductant filter 124 may facilitate prolonged desirable operation of the second reductant pump 147. In some embodiments, the second reductant pump 147 is coupled to a chassis of a vehicle associated with the aftertreatment system 100.

The second doser 145 includes at least one second injector 149 (e.g., insertion device, etc.). The second injector 149 is configured to dose the reductant received by the second doser 145 into the exhaust (e.g., within the second decomposition housing 152, etc.).

In some embodiments, the reductant delivery system 116 also includes a second air pump 150. In these embodiments, the second air pump 150 is fluidly coupled to the air source 130 and is configured to receive air from the air source 130. The second air pump 150 is fluidly coupled to the second doser 145 and is configured to provide the air to the second doser 145. The second doser 145 is configured to mix the air and the reductant into an air-reductant mixture and to provide the air-reductant mixture into the second decomposition housing 152. In some of these embodiments, the reductant delivery system 116 also includes the air filter 132 and the second air pump 150 is fluidly coupled to the air filter 132 and configured to receive the air from the air filter 132. In other embodiments, the reductant delivery system 116 does not include the second air pump 150 and/or the reductant delivery system 116 does not include the air source 130. In such embodiments, the second doser 145 is not configured to mix the reductant with air (e.g., the second doser 145 is a reductant-only doser, etc.).

The second doser 145, the second reductant pump 147, and the second air pump 150 are also electrically or communicatively coupled to the controller 134. The controller 134 is configured to control the second doser 145 to dose the reductant and/or the air-reductant mixture into the second decomposition housing 152. The controller 134 may also be configured to control the second reductant pump 147 and/or the second air pump 150 in order to control the reductant and/or the air-reductant mixture that is dosed into the second decomposition housing 152.

The aftertreatment system 100 also includes a fourth aftertreatment unit 154 (e.g., a SCR catalyst member, etc.). The fourth aftertreatment unit 154 includes a fourth aftertreatment component housing 117 and a fourth aftertreatment component 119 (e.g., a catalyst substrate, etc.) coupled to the fourth aftertreatment component housing 117. In some embodiments, the fourth aftertreatment component 119 is integrally formed with the fourth aftertreatment component housing 117. The fourth aftertreatment unit 154 is fluidly coupled to the second decomposition housing 152 and is configured to receive the second portion of the exhaust from the second decomposition housing 152. In some embodiments, the fourth aftertreatment component housing 117 is fastened (e.g., using a band, using bolts, etc.), welded, riveted, or otherwise attached to the second decomposition housing 152. In some embodiments, the fourth aftertreatment component housing 117 is integrally formed with the second decomposition housing 152.

The fourth aftertreatment unit 154 is configured to cause decomposition of the exhaust using the reductant. The second decomposition housing 152 is disposed upstream of the fourth aftertreatment unit 154. As a result, the reductant is injected by the second injector 149 upstream of the fourth aftertreatment unit 154 such that the fourth aftertreatment unit 154 is configured to receive a mixture of the reductant and exhaust. The reductant droplets undergo the processes of evaporation, thermolysis, and hydrolysis to form non-NOx emissions (e.g., gaseous ammonia, etc.) within the second decomposition housing 152 and/or the fourth aftertreatment unit 154.

The fourth aftertreatment unit 154 is configured to assist in the reduction of NOx emissions by accelerating a NOx reduction process between the reductant and the NOx of the exhaust into diatomic nitrogen, water, and/or carbon dioxide. The fourth aftertreatment unit 154 includes an inlet fluidly coupled to the second decomposition housing 152 from which exhaust and reductant are configured to be received and an outlet fluidly coupled to an end (e.g., tailpipe, etc.) of the aftertreatment system 100 which provides the exhaust to atmosphere. In some embodiments, the third aftertreatment unit 115, the second decomposition housing 152, and the fourth aftertreatment unit 154 are centered on a second longitudinal axis A2 that is substantially parallel to the first longitudinal axis A1.

Still referring to FIG. 1, the aftertreatment system 100 also includes a third DP sensor 172 and a fourth DP sensor 174 that are substantially similar to (or the same as) the first DP sensor 162 and the second DP sensor 164 in structure and function. For example, the third DP sensor 172 is configured to measure (e.g., determine, provide, etc.) a signal associated with a differential pressure across the third aftertreatment unit 115, and the fourth DP sensor 174 is configured to measure (e.g., determine, provide, etc.) a signal associated with a differential pressure across the second decomposition housing 152 and the fourth aftertreatment unit 154. The third DP sensor 172 and the fourth DP sensor 174 are each electrically or communicatively coupled to the controller 134, which is configured to determine a differential pressure based on signals provided by each of the third DP sensor 172 and the fourth DP sensor 174.

Furthermore, though not depicted in FIG. 1, the third DP sensor 172 includes a third sensor first inlet (e.g., high port, upstream inlet, etc.) and a third sensor second inlet (e.g., low port, downstream inlet, etc.) positioned downstream of the third sensor first inlet. Similarly, the fourth DP sensor 174 includes a fourth sensor first inlet (e.g., high port, upstream inlet, etc.) and a fourth sensor second inlet (e.g., low port, downstream inlet, etc.) positioned downstream of the fourth sensor first inlet.

The aftertreatment system 100 further includes a second pressure tube assembly 170 that is substantially similar to (or the same as) the first pressure tube assembly 160. For example, the second pressure tube assembly 170 includes a first pressure tube segment S4 configured as a branched segment (e.g., having a "Y"-shaped structure). The first pressure tube segment S4 includes a first subsegment 177 coupled to (e.g., welded to, attached to, integrally formed with, etc.) a second subsegment 178.

In some embodiments, the first pressure tube segment S4 are substantially similar to (or the same as) the first pressure tube segment S1 of the aftertreatment system 100 in structure and function. For example, the first subsegment 177 is in fluid communication with the third sensor second inlet of the third DP sensor 172 and an interior of the second decomposition housing 152. In various embodiments, the second decomposition housing 152 includes a second decomposition housing port 173 configured to provide fluid communication between the interior of the second decomposition housing 152 and an exterior component, such as the first subsegment 177 and the second subsegment 178. As such, the exhaust present in the second decomposition housing 152 (e.g., at the or near the inlet of the second decomposition housing 152) can be sampled (or measured) by the third DP sensor 172 through the first subsegment 177. In some embodiments, the second decomposition housing port 173 is positioned at or near the inlet of the second decomposition housing 152.

The second subsegment 178 is in fluid communication with the fourth sensor first inlet of the fourth DP sensor 174 and the interior of the second decomposition housing 152 through the second decomposition housing port 173. In this regard, the exhaust present in the second decomposition housing 152 (e.g., at or near the inlet of the second decomposition housing 152) can be sampled (or measured) by the fourth DP sensor 174 through the second subsegment 178. Accordingly, the pressure of the exhaust measured at the second decomposition housing port 173 serves as a common reference pressure for determining the differential pressure across the third aftertreatment unit 115 using the third DP sensor 172 and the differential pressure across the second decomposition housing 152 and the fourth aftertreatment unit 154 using the fourth DP sensor 174.

Furthermore, the second pressure tube segment S5 is in fluid communication with the third sensor first inlet of the third DP sensor 172 and an interior of the third aftertreatment unit 115. The third aftertreatment component housing 111 includes a third aftertreatment component housing port 171 configured to provide fluid communication between the interior of the third aftertreatment unit 115 and an exterior component, such as the third sensor first inlet of the third DP sensor 172, through the second pressure tube segment S5. The third pressure tube S6 is in fluid communication with the fourth sensor second inlet of the fourth DP sensor 174 and an interior of the fourth aftertreatment unit 154. The fourth aftertreatment component housing 117 includes a fourth aftertreatment component housing port 175 configured to provide fluid communication between the interior of the fourth aftertreatment unit 154 and an exterior component, such as the fourth sensor second inlet of the fourth DP sensor 174 through the third pressure tube segment S6.

In various embodiments, the structures and arrangements of the first pressure tube segment S4 (i.e., the first subsegment 177 and the second subsegment 178), the second pressure tube segment S5, and the third pressure tube S6 are substantially similar to (or the same as) those of the corresponding pressure tube segments of the first pressure tube assembly 160. Accordingly, detailed description of such structures and arrangement is omitted herein for purposes of brevity.

Additionally, though not depicted herein, the aftertreatment system 100 may include sensor tables each configured to fasten or otherwise attach each of the third DP sensor 172 and the fourth DP sensor 174 to exterior surfaces of the third aftertreatment component housing 111 and the fourth aftertreatment component housing 117, respectively. The sensor tables of the aftertreatment system 100 may be configured to have substantially the same structures as those of the first sensor table 182 and the second sensor table 184 of the aftertreatment system 100.

Non-limiting advantages of the branched (e.g., split, "Y"-shaped, etc.) structure of the first pressure tube segment S4 of the second pressure tube assembly 170 are analogous to those of the first pressure tube segment S1 of the first pressure tube assembly 160 described in detail above. For example, the pressure of the exhaust measured at the second decomposition housing port 173 serves as a common pressure source for determining a differential pressure across the third aftertreatment unit 115 based on the pressure measured at the third aftertreatment component housing port 171 and for determining a differential pressure across the second decomposition housing 152 and the fourth aftertreatment unit 154 based on the pressure measured at the fourth aftertreatment component housing port 175. In this way, a total number of pressure ports needed to facilitate the measurements of the differential pressure in the aftertreatment system 100 is reduced, thereby reducing the space claim associated with the installation of the third DP sensor 172, the fourth DP sensor 174, and the corresponding second pressure tube assembly 170 for improved integration of the components in the aftertreatment system 100.

While the aftertreatment system 100 has been shown and described in the context of use with a diesel internal combustion engine, it is understood that the aftertreatment system 100 may be used with other internal combustion engines, such as gasoline internal combustion engines, hybrid internal combustion engines, propane internal combustion engines, and other similar internal combustion engines.

III. Another Example Aftertreatment System

Figure 9:
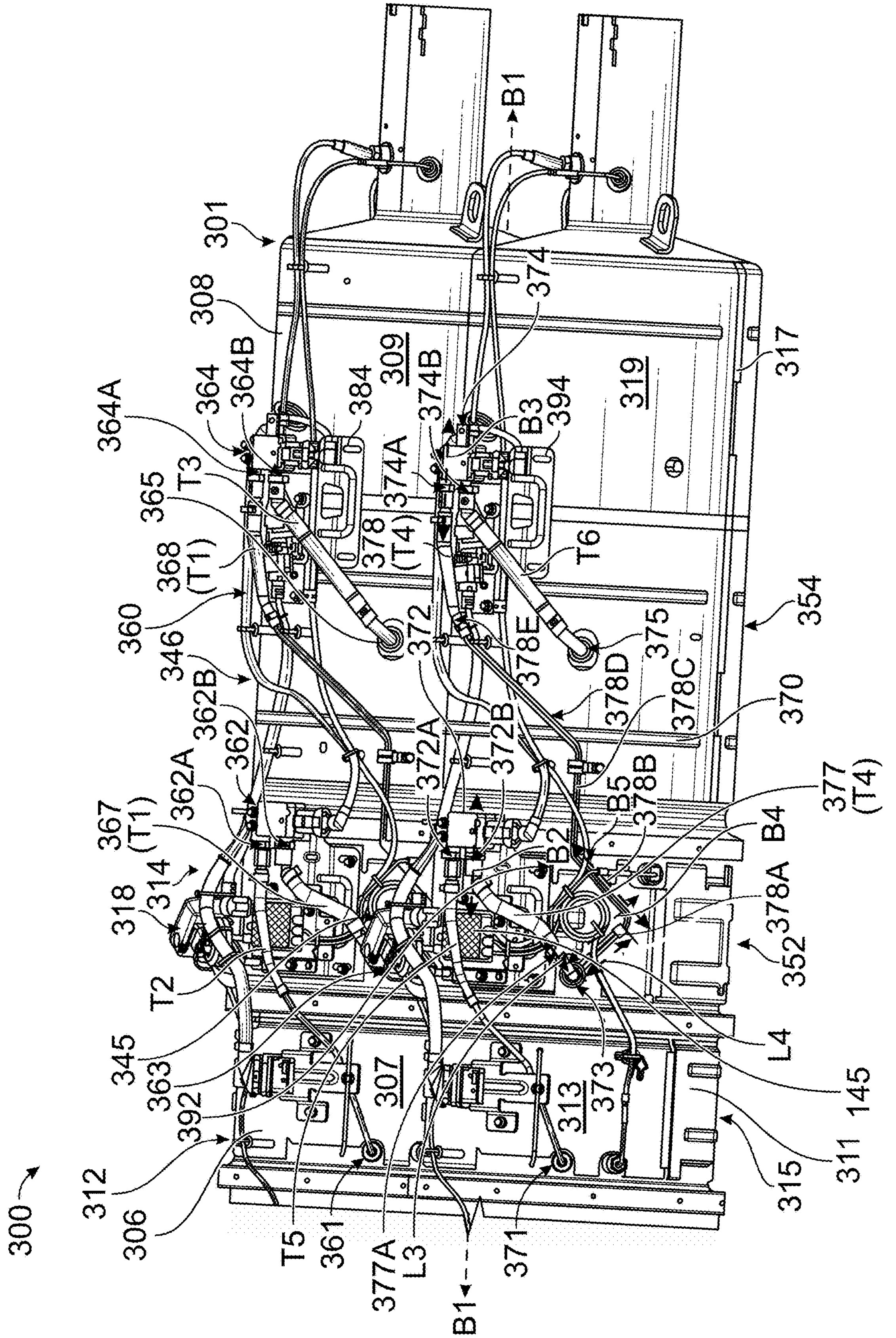
FIG. 9 is a schematic diagram of an example aftertreatment system.

FIG. 9 depicts an example aftertreatment system 300 that is similar (e.g., analogous) to the aftertreatment system 100. The aftertreatment system 300 is configured to treat exhaust produced by an internal combustion engine system similar to the internal combustion engine system 10 as depicted in FIG. 1.

In some embodiments, the aftertreatment system 300 includes a distributing housing (e.g., pressure regulator, flow plenum, flow balancer, flow balancing system, etc.; not depicted) similar to the distributing housing 104 described herein. In some embodiments, the aftertreatment 300 also includes a conduit 301. The conduit 301 is centered on a first longitudinal axis B1. The conduit 301 is configured to house components of the aftertreatment system 300 described in detail below. Additional components of the aftertreatment system 300, including but not limited to, a reductant delivery system (similar to the reductant delivery system 116) and a controller (similar to the controller 134), are partially depicted or omitted entirely in FIG. 9 for purposes of simplicity.

The aftertreatment system 300 includes a first aftertreatment unit 312 (e.g., an exhaust filtration unit, etc.) similar to the first aftertreatment unit 112 described herein. In various embodiments, the first aftertreatment unit 312 is disposed downstream of the distributing housing and configured to receive a first portion of the exhaust from the distributing housing. The first aftertreatment unit 312 includes a first aftertreatment component housing 306 and a first aftertreatment component 307 (e.g., an exhaust filtration device, etc.) disposed within the first aftertreatment component housing 306. The first aftertreatment component housing 306 and the first aftertreatment component 307 are similar to the first aftertreatment component housing 106 and the first aftertreatment component 107, respectively, described herein.

The aftertreatment system 300 also includes a first decomposition housing 314 (e.g., decomposition reactor, hydrocarbon mixer, decomposition chamber, reactor pipe, decomposition tube, reactor tube, etc.), which is similar to the first decomposition housing 114 described herein. The aftertreatment system 300 further includes a reductant delivery system (not depicted in its entirety). The reductant delivery system includes a first doser 318 (e.g., dosing module, etc.) similar to the first doser 118 described herein. The first doser 318 is configured to facilitate passage of the reductant through the first decomposition housing 314 (and the conduit 301) and into the first decomposition housing 314.

The aftertreatment system 300 also includes a second aftertreatment unit 346 (e.g., a SCR catalyst member, etc.) similar to the second aftertreatment unit 146 described herein. The second aftertreatment unit 346 includes a second aftertreatment component housing 308 and a second aftertreatment component 309 coupled to the second aftertreatment component housing 308. The second aftertreatment component housing 308 and the second aftertreatment component 309 are similar to the second aftertreatment component housing 108 and the second aftertreatment component 109, respectively, described herein.

The aftertreatment system 300 further includes a first DP sensor 362 and a second DP sensor 364. The first DP sensor 362 and the second DP sensor 364 are similar to the first DP sensor 162 and the second DP sensor 164, respectively, described herein. For example, the first DP sensor 362 is configured to measure (e.g., determine, provide, etc.) a signal associated with a differential pressure across the first aftertreatment unit 312, and the second DP sensor 364 is configured to measure (e.g., determine, provide, etc.) a signal associated with a differential pressure across the first decomposition housing 314 and the second aftertreatment unit 346. The first DP sensor 362 and the second DP sensor 364 are each electrically or communicatively coupled to a controller (not depicted) of the aftertreatment system 300, which is configured to determine a differential pressure based on signals provided by each of the first DP sensor 362 and the second DP sensor 364.

The first DP sensor 362 includes a first sensor first inlet 362A (e.g., high port, upstream inlet, etc.) and a first sensor second inlet 362B (e.g., low port, downstream inlet, etc.) positioned downstream of the first sensor first inlet 362A. The first sensor first inlet 362A and the first sensor second inlet 362B have functions similar to those of the first sensor first inlet 162A and the first sensor second inlet 162B, respectively, described herein. The second DP sensor 364 includes a second sensor first inlet 364A (e.g., high port, upstream inlet, etc.) and a second sensor second inlet 364B (e.g., low port, downstream inlet, etc.) positioned downstream of the second sensor first inlet 364A. The second sensor first inlet 364A and the second sensor second inlet 364B have functions similar to those of the second sensor first inlet 164A and the second sensor second inlet 164B, respectively, as described herein.

In some embodiments, the aftertreatment system 300 includes a first sensor table 382 and a second sensor table 384. The first sensor table 382 and a second sensor table 384 have functions similar to those of the first sensor table 182 and the second sensor table 184, respectively, described herein. However, different from the first sensor table 182, the first sensor table 382 is fastened (e.g., using a band, using bolts, etc.), welded, riveted, or otherwise attached to an exterior surface of the first decomposition housing 314 instead of the first aftertreatment unit 312. The second sensor table 384 is fastened, welded, riveted, or otherwise attached to an exterior surface of the second aftertreatment component housing 308. The first DP sensor 362 and the second DP sensor 364 are in turn fastened or otherwise attached to the first sensor table 382 and the second sensor table 384, respectively.

The aftertreatment system 300 further includes a first pressure tube assembly 360 having functions similar to those of the first pressure tube assembly 160 described herein. The first pressure tube assembly 360 includes a first pressure tube segment T1 configured as a branched segment (e.g., having a split structure, etc.) similar to the first pressure tube segment S1 described herein. The first pressure tube segment T1 includes a first subsegment 367 coupled to (e.g., welded to, attached to, integrally formed with, etc.) a second subsegment 368, which have functions similar to those of the first subsegment 167 and the second subsegment 168, respectively. For example, the first subsegment 367 is in fluid communication with the first sensor second inlet 362B of the first DP sensor 362 and an interior of the first decomposition housing 314 through a first decomposition housing port 363, and the second subsegment 368 is in fluid communication with the second sensor first inlet 364A and the interior of the first decomposition housing 314 through the first decomposition housing port 363. In some embodiments, the first decomposition housing port 363 is positioned at or near the inlet of the first decomposition housing 314.

The first pressure tube assembly 360 also includes a second pressure tube segment T2 having functions similar to those of the second pressure tube segment S2 described herein. For example, the second pressure tube segment T2 is in fluid communication with the first sensor first inlet 362A of the first DP sensor 362 and an interior of the first aftertreatment unit 312 through a first aftertreatment component housing port 361.

The first pressure tube assembly 360 further includes a third pressure tube segment T3 having functions similar to those of the third pressure tube segment S3 described herein. For example, the third pressure tube segment T3 is in fluid communication with the second sensor second inlet 364B of the second DP sensor 364 and an interior of the second aftertreatment unit 346 through a second aftertreatment component housing port 365.

The aftertreatment system 300 further includes a third aftertreatment unit 315 (e.g., an exhaust filtration unit, etc.) similar to the third aftertreatment unit 115 described herein. In various embodiments, the first aftertreatment unit 315 is disposed downstream of the distributing housing and configured to receive a second portion of the exhaust from the distributing housing. The third aftertreatment unit 315 includes a third aftertreatment component housing 311 and a third aftertreatment component 313 (e.g., an exhaust filtration device, etc.) disposed within the third aftertreatment component housing 311. The third aftertreatment component housing 311 and the third aftertreatment component 313 are similar to the third aftertreatment component housing 111 and the third aftertreatment component 113, respectively, described herein.

The aftertreatment system 300 also includes a second decomposition housing 352 (e.g., decomposition reactor, hydrocarbon mixer, decomposition chamber, reactor pipe, decomposition tube, reactor tube, etc.), which is similar to the second decomposition housing 152 described herein. The reductant delivery system of the aftertreatment system 300 includes a second doser 345 (e.g., dosing module, etc.) similar to the second doser 145 described herein. The second doser 345 is configured to facilitate passage of the reductant through the second decomposition housing 352 (and the conduit 301) and into the second decomposition housing 352.

The aftertreatment system 300 also includes a fourth aftertreatment unit 354 (e.g., a SCR catalyst member, etc.) similar to the fourth aftertreatment unit 154 described herein. The fourth aftertreatment unit 354 includes a fourth aftertreatment component housing 317 and a fourth aftertreatment component 319 coupled to the fourth aftertreatment component housing 317. The second aftertreatment component housing 308 and the second aftertreatment component 309 are similar to the second aftertreatment component housing 108 and the second aftertreatment component 109, respectively, described herein.

The aftertreatment system 300 further includes a third DP sensor 372 and a fourth DP sensor 374. The third DP sensor 372 and the fourth DP sensor 374 are similar to the third DP sensor 172 and the fourth DP sensor 174, respectively, described herein. For example, the third DP sensor 372 is configured to measure (e.g., determine, provide, etc.) a signal associated with a differential pressure across the third aftertreatment unit 315, and the fourth DP sensor 374 is configured to measure (e.g., determine, provide, etc.) a signal associated with a differential pressure across the second decomposition housing 352 and the fourth aftertreatment unit 354. The third DP sensor 372 and the fourth DP sensor 374 are each electrically or communicatively coupled to the controller of the aftertreatment system 300, which is configured to determine a differential pressure based on signals provided by each of the third DP sensor 372 and the fourth DP sensor 374.

The third DP sensor 372 includes a third sensor first inlet 372A (e.g., high port, upstream inlet, etc.) and a third sensor second inlet 372B (e.g., low port, downstream inlet, etc.) positioned downstream of the third sensor first inlet 372A. The third sensor first inlet 372A and the fourth sensor second inlet 372B are similar to the third sensor first inlet 172A and the third sensor second inlet 172B, respectively, as described herein. The fourth DP sensor 374 includes a fourth sensor first inlet 374A (e.g., high port, upstream inlet, etc.) and a fourth sensor second inlet 374B (e.g., low port, downstream inlet, etc.) positioned downstream of the fourth sensor first inlet 374A. The fourth sensor first inlet 374A and the fourth sensor second inlet 374B are similar to the fourth sensor first inlet 174A and the fourth sensor second inlet 174B, respectively, as described herein.

In some embodiments, an orientation of each of the third DP sensor 372 and the fourth DP sensor 374 (and the first sensor 362 and the second sensor 364) with respect to the first longitudinal axis B1 is different from that of each of the DP sensors 172 and 174 (and the DP sensors 162 and 164) with respect to the first longitudinal axis A1 of the aftertreatment system 100. For example, as depicted in FIG. 9, the third sensor second inlet 372B extends along an axis B2 that is substantially parallel to the first longitudinal axis B1. In contrast, the axis A7 along which the first sensor second inlet 162B extends is substantially perpendicular to the first longitudinal axis A1 of the aftertreatment 100. Similarly, the fourth sensor first inlet 374A extends along an axis B3 that is also substantially parallel to the first longitudinal axis B1. In contrast, the axis A9 along which the second sensor first inlet 164B extends is substantially perpendicular to the first longitudinal axis A1 of the aftertreatment 100.

In some embodiments, the aftertreatment system 300 includes a third sensor table 392 and a fourth sensor table 394. The third sensor table 392 and the fourth sensor table 394 have similar functions and arrangements to those of the first sensor table 382 and the second sensor table 384, respectively, described herein. For example, the third sensor table 392 is fastened (e.g., using a band, using bolts, etc.), welded, riveted, or otherwise attached to an exterior surface of the second decomposition housing 352, and the fourth sensor table 394 is fastened, welded, riveted, or otherwise attached to an exterior surface of the second aftertreatment component housing 317. The third DP sensor 372 and the fourth DP sensor 374 are in turn fastened or otherwise attached to the third sensor table 392 and the fourth sensor table 394, respectively.

The aftertreatment system 300 further includes a second pressure tube assembly 370 similar to the first pressure tube assembly 360 described herein. The second pressure tube assembly 370 includes a first pressure tube segment T4 configured as a branched segment (e.g., having a split structure, etc.) similar to the first pressure tube segment S4 described herein. The first pressure tube segment T4 includes a first subsegment 377 coupled to (e.g., welded to, attached to, integrally formed with, etc.) a second subsegment 378. The first subsegment 377 and the second subsegment 378 have functions similar to those of the first subsegment 167 and the second subsegment 168, respectively. For example, the first subsegment 377 is in fluid communication with the third sensor second inlet 372B of the third DP sensor 372 and an interior of the second decomposition housing 352 through a second decomposition housing port 373, and the second subsegment 378 is in fluid communication with the fourth sensor first inlet 374A and the interior of the second decomposition housing 352 through the second decomposition housing port 373. In some embodiments, the second decomposition housing port 373 is positioned at or near the inlet of the second decomposition housing 352.

The second pressure tube assembly 370 also includes a second pressure tube segment T5 having functions similar to those of the second pressure tube segment S5. For example, the second pressure tube segment T5 is in fluid communication with the third sensor first inlet 372A of the third DP sensor 372 and an interior of the third aftertreatment unit 315 through a third aftertreatment component housing port 371.

The second pressure tube assembly 370 further includes a third pressure tube segment T6 having functions similar to those of the third pressure tube segment S6 described herein. For example, the third pressure tube segment T6 is in fluid communication with the fourth sensor second inlet 374B of the fourth DP sensor 374 and an interior of the second aftertreatment unit 354 through a fourth aftertreatment component housing port 375.

In some embodiments, the first subsegment 377 includes at least a straight portion 377C, which corresponds to the second straight portion 167C of the first subsegment 167 described herein. The straight portion 377C has a first length L3. The second subsegment 378 includes at least a first straight portion 378A and a second straight portion 378B coupled to the first straight portion 378A. The first straight portion 378A corresponds to the first straight portion 168A and has a second length L4. The first straight portion 378A extends along an axis B4 and the second straight portion 378B extends along an axis B5. In some embodiments, the axes B4 and B5 are substantially perpendicular to one another as depicted herein. The second subsegment 378 may further include a third straight portion 378C coupled to the second straight portion 378B, a fourth straight portion 378D coupled to the third straight portion 378C, and a portion 378E coupled to the fourth straight portion 378D. The portion 378E may include a straight portion, a curved portion, or a combination thereof.

In some embodiments, the first length L3 and the second length L4 each vary according to orientation and installation of the third sensor table 292 and/or the fourth sensor table 294. In some embodiments, as depicted in FIG. 9, the second length L4 is greater than the first length L3. In some embodiments, the second length L4 is less than the first length L3. In some embodiments, the first length L3 is in a range of approximately 25 mm to approximately 1500 mm, and the second length L4 is in a range of approximately 25 mm to approximately 1500 mm. The values of the first length L3 and the second length L4 are for illustrative purposes only and not intended to limit the embodiments of the present disclosure.

It is noted that the configurations and example dimensions of the first subsegment 377 and the second subsegment 378 in the second pressure tube assembly 370 are also applicable to those of their counterparts in the first pressure tube assembly 360 of the aftertreatment system 300.

While one or more portions of the first pressure tube assembly 360 and the second pressure tube assembly 370 are described herein as extending along axes that are substantially straight, it is noted that such descriptions are only intended to illustrate example configurations of the first pressure tube assembly 360 and the second pressure tube assembly 370 and not to limit the embodiments thereof in the present disclosure. For example, these portions of the first pressure tube assembly 360 and the second pressure tube assembly 370 the first pressure tube assembly 360 and the second pressure tube assembly 370 may be curved and therefore may not extend along an axis.

III. Configuration of Example Embodiments

As utilized herein, an area is measured along a plane (e.g., a two-dimensional plane, etc.) unless otherwise indicated. This area may change in a direction that is not disposed along the plane (e.g., along a direction that is orthogonal to the plane, etc.) unless otherwise indicated.

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to," "in fluid communication," and the like, as used herein, mean the two components or objects have a pathway formed between the two components or objects in which a fluid, such as air, reductant, an air-reductant mixture, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. An aftertreatment system comprising:

a decomposition housing comprising a decomposition housing port configured to provide fluid communication through the decomposition housing;

a doser coupled to the decomposition housing and configured to introduce a reductant to the decomposition housing;

a first aftertreatment unit located upstream of the decomposition housing and comprising a first aftertreatment component and a first aftertreatment component housing that houses the first aftertreatment component, the first aftertreatment component housing comprising a first aftertreatment component housing port configured to provide fluid communication through the first aftertreatment component housing;

a second aftertreatment unit located downstream of the decomposition housing and comprising a second aftertreatment component and a second aftertreatment component housing that houses the second aftertreatment component, the second aftertreatment component housing comprising a second aftertreatment component housing port configured to provide fluid communication through the second aftertreatment component housing;

a first differential pressure sensor having a first sensor first inlet and a first sensor second inlet;

a second differential pressure sensor having a second sensor first inlet and a second sensor second inlet;

a first pressure tube segment in fluid communication with the decomposition housing port, the first sensor first inlet, and the second sensor first inlet;

a second pressure tube segment in fluid communication with the first sensor second inlet and the first aftertreatment component housing port; and a third pressure tube segment in fluid communication with the second sensor second inlet and the second aftertreatment component housing port.

2. The aftertreatment system of claim 1, wherein:

the first aftertreatment component is a particulate filter, and the second aftertreatment component is a catalyst substrate.

3. The aftertreatment system of claim 1, further comprising a controller programmed to:

determine a first differential pressure of exhaust based on a first sensor first signal received from the first sensor first inlet and a first sensor second signal received from the first sensor second inlet, and determine a second differential pressure of the exhaust based on a second sensor first signal received from the second sensor first inlet and a second sensor second signal received from the second sensor second inlet.

4. The aftertreatment system of claim 1, wherein the first pressure tube segment, the second pressure tube segment, and the third pressure tube segment are each formed of a metal.

5. The aftertreatment system of claim 1, wherein:

the decomposition housing is centered on a longitudinal axis, the first pressure tube segment comprises:

a first subsegment comprising:

a first straight portion extending radially from the longitudinal axis along a first axis, a first curved portion coupled to the first straight portion, a second straight portion coupled to the first curved portion and extending along a second axis, a second curved portion coupled to the second straight portion, and a third straight portion coupled to the second curved portion and extending along a third axis, and a second subsegment comprising a fourth straight portion coupled to a fourth curved portion, the fourth straight portion extending along a fourth axis and joins the first subsegment at the first straight portion.

6. The aftertreatment system of claim 5, wherein the first subsegment and the second subsegment are integrally formed.

7. The aftertreatment system of claim 5, wherein:

a first angle between the first axis and the fourth axis is 90°, a second angle between the first axis and the second axis is 90°, and a third angle between the second axis and the third axis is in a range of 100° to 140°.

8. The aftertreatment system of claim 1, further comprising a distributing housing coupled to an inlet of the first aftertreatment component housing, wherein:

the distributing housing configured to receive exhaust and divide the exhaust into a first portion of the exhaust and a second portion of the exhaust, and the first aftertreatment component is configured to receive the first portion of the exhaust.

* * * * *